United States Patent [19]
Ward et al.

[11] Patent Number: 5,012,995
[45] Date of Patent: May 7, 1991

[54] ADJUSTABLE WIRING HARNESS CLIP

[75] Inventors: Robert W. Ward, Warren, Ohio; Robert A. Jablonski, Menlo Park, Calif.

[73] Assignee: General Motors Corporation, Detroit, Mich.

[21] Appl. No.: 494,377

[22] Filed: Mar. 16, 1990

[51] Int. Cl.$^5$ .............................................. F16L 3/00
[52] U.S. Cl. ................................. 248/68.1; 248/73; 248/74.1
[58] Field of Search ............ 248/68.1, 67.5, 71, 248/73, 70, 72, 74.1, 62, 298

[56] References Cited

U.S. PATENT DOCUMENTS

| | | | |
|---|---|---|---|
| 1,034,444 | 8/1912 | Hazen | 248/73 X |
| 2,931,851 | 4/1960 | Sims | 248/74.1 X |
| 3,210,030 | 10/1965 | Ramsey et al. | 248/74.1 X |
| 3,807,675 | 4/1974 | Seckerson et al. | 248/73 |
| 4,795,114 | 1/1989 | Usui et al. | 248/74.1 X |
| 4,886,228 | 12/1989 | Kennedy | 248/71 X |

FOREIGN PATENT DOCUMENTS

| | | | |
|---|---|---|---|
| 1189026 | 9/1959 | France | 248/73 |
| 827170 | 2/1960 | United Kingdom | 248/70 |

*Primary Examiner*—David L. Talbott
*Attorney, Agent, or Firm*—F. J. Fodale

[57] ABSTRACT

A wiring harness clip comprises an elongated body having a channel intermediate end portions which are attached to a wiring harness by a wrapping or tape. A slide which is slideably mounted in the channel so that a self-expanding head of the slide which is insertable into a hole in a panel for attaching the wiring harness clip to the panel adjusts to the location of the hole.

3 Claims, 1 Drawing Sheet

ADJUSTABLE WIRING HARNESS CLIP

BACKGROUND OF THE INVENTION

This invention relates generally to wiring harness clips which are used to route wiring harnesses and more specifically to wiring harness clips which are attached at predetermined locations along the wiring harnesses to secure the wiring harness to support panels and the like existing along the route.

Such wiring harness clips are already known, for example, from U.S. Pat. No. 3,210,030 granted to Charles W. Ramsey and Norman F. Uhlir Oct. 5, 1965 and U.S. Pat. No. 2,931,851 granted to Robert H. Sims April 5, 1960. Each of these known wiring harness clips comprise an elongated body having a self-expanding head which is integrally attached in a fixed position of the elongated body. The elongated bodies are attached at predetermined locations along the wiring harness by a wrapping of tape or insulating material. The self-expanding heads are then inserted into pre-existing holes in support panels along the wiring harness route.

The wiring harness clips are commonly attached to the wiring harnesses at one site and then shipped for installation at another. Consequently these prior art wiring harness clips require precise attachment to the wiring harnesses at the predetermined locations so that the self-expanding heads align with the pre-existing holes in the mounting panels when the wiring harnesses are subsequently installed.

SUMMARY OF THE INVENTION

The object of this invention is to provide a wiring harness clip which accommodates a greater tolerance or variation in the predetermined location where the wiring harness clip is attached to the wiring harness while still providing adequate alignment with mounting panels during subsequent installation.

A feature of the invention is that the self-expanding head, or panel mounting means of the wiring harness clip is slideably mounted on the elongated body which is attached to the wiring harness so that the wiring harness clip accommodates variation between the location of the panel mounting means of the wiring harness and the panel hole or cooperating panel mounting means to which the wiring harness clip is to be attached.

Another feature of the invention is that the wiring harness clip is shaped so that the panel mounting means is attached to a slide which slides freely when the wiring harness clip is attached to a wiring harness.

Other objects and features of the invention will become apparent to those skilled in the art as disclosure is made in the following detailed description of a preferred embodiment of the invention which sets forth the best mode of the invention contemplated by the inventors and which is illustrated in the accompanying sheet(s) of drawing.

DETAILED DESCRIPTION OF THE PREFERRED EMBODIMENT

Figure 1:
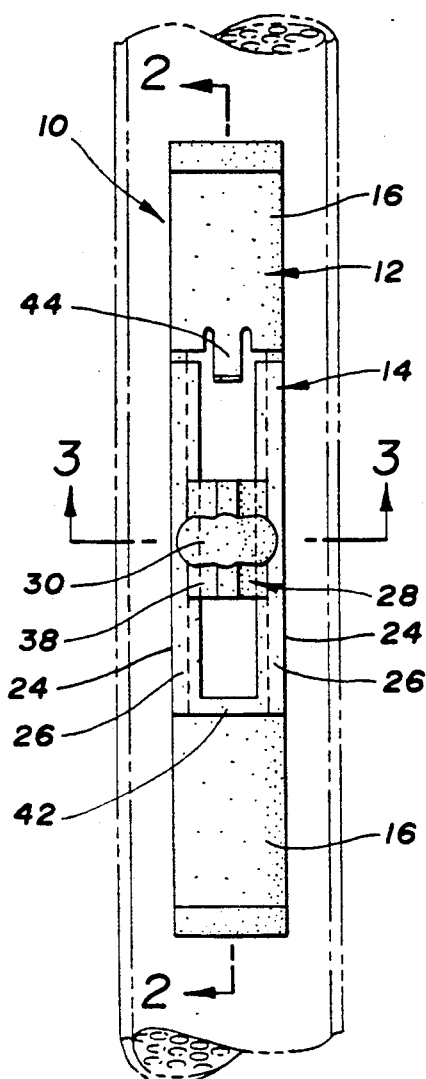
FIG. 1 is a top view of a wiring harness clip in accordance with our invention shown atop a wiring harness which is represented in phantom lines.
Figure 2:
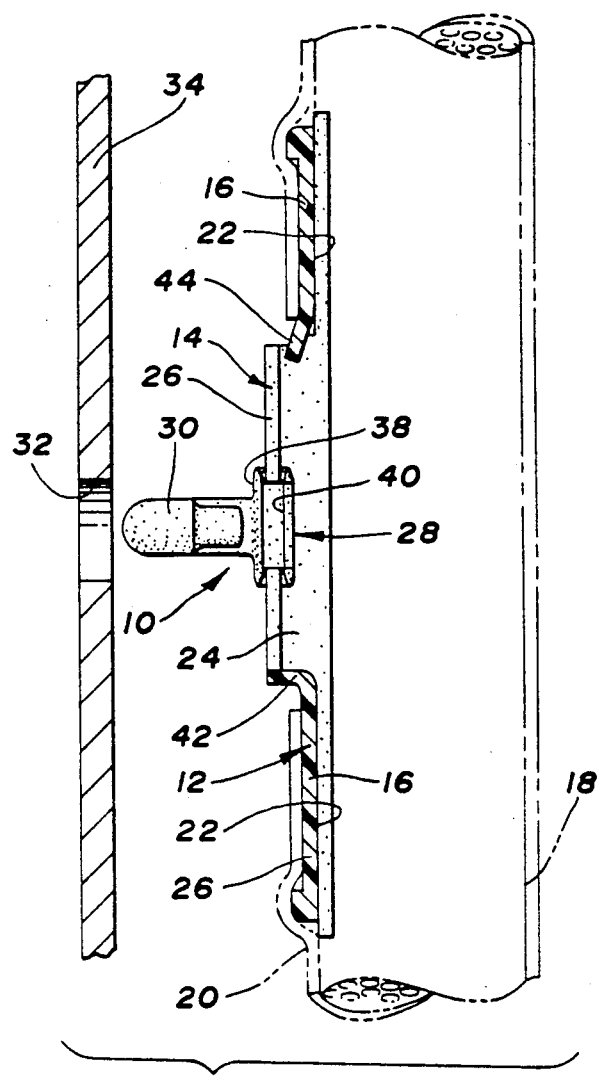
FIG. 2 is a section taken substantially along the line 2—2 of FIG. 1 looking in the direction of the arrows.
Figure 3:
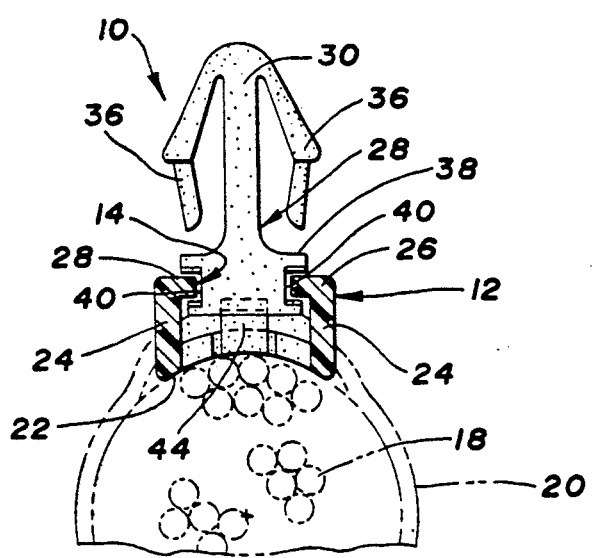
FIG. 3 is a section taken substantially along the line 3—3 of FIG. 1 looking in the direction of the arrows.

Referring now to the drawing, a wiring harness clip in accordance with our invention is indicated generally at 10. The wiring harness clip 10 comprises an elongated body 12 which has a channel 14 and intermediate end portions 16. The two end portions 16 are curved to facilitate attaching the wiring harness clip 10 to a wiring harness 18 at a preselected location on the wiring harness 18 by a wrapping of tape 20 or other suitable securing means as shown in FIGS. 2 and 3. These two end portions 16 also define the curved lower surface 22 of the elongated body 12 which rests on the wiring harness 18 when the wiring harness clip 10 is secured to the wiring harness 18 by taping or the like.

The intermediate channel 14 has laterally spaced side walls 24 which are integrally connected to the respective end portions 16. The laterally spaced side walls 24 have inwardly directed rails 26 at their respective upper ends which are used to slideably mount a slide 28 which forms part of the wiring harness clip 10.

The slide 28 includes a self-expanding head 30 which is insertable into a hole 32 of a support panel 34 for attaching the wiring harness clip 10 to the panel 34 as indicated in FIG. 2. When the self-expanding head 30 is inserted into the hole 32 the panel is clamped between resilient legs 36 of the self-expanding head 30 and a base 38 in a well known manner. The base 38 which forms part of the slide 28 includes slots 40 which slideably engage the inwardly directed rails 26 to slideably mount the slide 28 in the channel 14 of the wiring harness clip 10 as best shown in FIG. 3.

The height of the side walls 24 is such that the inwardly directed rails 26 are spaced above the curved lower surface 22 of the elongated body 12 a sufficient amount so that the slide 28 slides freely of the wiring harness 18 when the wiring harness clip 10 is attached to the wiring harness by taping or the like.

One of the curved end portions 16 of the elongated body 12 has an end wall 42 which closes off one end of the channel 14 and retains the slide 28 in the channel 14 at one end. The other of the curved end portions 16 has a cantilevered latch finger 44 which slants upwardly toward the channel 14 and retains the slide 28 in the channel 14 at the opposite end. The latch finger 44 is sufficiently resilient to permit snap assembly of the slide 28 into the channel 14.

In practice, a number of these wiring harness clips 10 are usually attached to a single wiring harness 18 at several predetermined locations in a factory and then shipped for installation at a vehicle assembly plant. These wiring harnesses are then easily installed as the slide mounted self-expanding heads accommodate alignment with the pre-existing holes which are provided in vehicle panels for routing the wiring harness.

We wish it to be understood that we do not desire to be limited to the exact details of construction shown and described, for obvious modifications will occur to a person skilled in the art.

The embodiments of the invention in which an exclusive property or privilege is claimed are defined as follows:

1. A wiring harness clip for attaching a wiring harness to a panel comprising:
    an elongated body having a channel intermediate end portions which are adapted for attachment to a wiring harness, and a slide which is slideably mounted in the channel so that panel mounting means of the slide for attaching the wiring harness clip to a panel is adjustable relative to the wiring harness when the wiring harness clip is attached to the wiring harness at a predetermined location, the channel being shaped so that the slide is spaced above surfaces of the end portions adapted to engage the wiring harness whereby the slide is freely slideable in the channel when the wiring harness clip is attached to the wiring harness.

2. A wiring harness clip for attaching a wiring harness to a panel having a hole comprising:

an elongated body having a channel intermediate curved end portions which are adapted to attachment to a wiring harness at a preselected location on the wiring harness, the end portions defining a curved lower surface of the elongated body which rests on a wiring harness when the elongated body is attached to the wiring harness, the channel having laterally spaced side walls which have inwardly directed rails, the wiring harness clip further comprising a slide which is slideably mounted on the inwardly directed rails, the slide having a self-expanding head which is insertable into a hole of a panel for attaching the wiring harness clip to the panel and a base which includes slots slideably engaging the inwardly directed rails to slideably mount the slide on the elongated body of the wiring harness clip, and the inwardly directed rails being spaced above the curved lower surface of the elongated body a sufficient amount so that the slide slides freely in the channel when the wiring harness clip is attached to the wiring harness.

3. A wiring harness clip for attaching a wiring harness to a panel having a hole comprising:

an elongated body having a channel intermediate end portions which are adapted for attachment to a wiring harness at a preselected location on the wiring harness, the end portions defining a curved lower surface of the elongated body which rests on a wiring harness when the elongated body is attached to the wiring harness, the channel having laterally spaced side walls which have inwardly directed rails, the wiring harness clip further comprising a slide which is slideably mounted on the inwardly directed rails, the slide having a head which is insertable into a hole of a panel for attaching the wiring harness clip to the panel and a base which includes slots slideably engaging the inwardly directed rails to slideably mount the slide on the elongated body of the wiring harness clip, and the inwardly directed rails being spaced above the lower surface of the elongated body a sufficient amount so that the slide slides in the channel when the wiring harness clip is attached to the wiring harness.

* * * * *